United States Patent
Pellizzon

(12) 
(10) Patent No.: US 10,702,917 B2
(45) Date of Patent: Jul. 7, 2020

(54) COOLING SYSTEM FOR MOLDING FIXTURES, PARTICULARLY FOR FOUNDRY MOLDS

(71) Applicant: ALFI S.R.L., Noale (IT)

(72) Inventor: Irene Pellizzon, Noale (IT)

(73) Assignee: ALFI S.R.L., Noale (IT)

( * ) Notice: Subject to any disclaimer, the term of this patent is extended or adjusted under 35 U.S.C. 154(b) by 0 days.

(21) Appl. No.: 16/202,125

(22) Filed: Nov. 28, 2018

(65) Prior Publication Data
US 2019/0091762 A1 Mar. 28, 2019

Related U.S. Application Data

(63) Continuation of application No. 14/654,534, filed as application No. PCT/IB2013/061150 on Dec. 19, 2013, now abandoned.

(30) Foreign Application Priority Data

Dec. 21, 2012 (IT) .............................. PD2012A0402

(51) Int. Cl.
B01D 61/02 (2006.01)
B22C 9/06 (2006.01)
B22D 17/22 (2006.01)
B22D 30/00 (2006.01)
B22D 46/00 (2006.01)
B29C 45/73 (2006.01)
C02F 1/44 (2006.01)
C02F 103/02 (2006.01)

(52) U.S. Cl.
CPC .............. *B22D 30/00* (2013.01); *B22C 9/065* (2013.01); *B22D 17/2218* (2013.01); *B22D 46/00* (2013.01); *C02F 1/441* (2013.01); *B01D 61/025* (2013.01); *B29C 45/73* (2013.01); *B29C 45/7337* (2013.01); *C02F 2103/023* (2013.01)

(58) Field of Classification Search
CPC .... B22D 30/00; B22D 17/2218; B22D 46/00; B22C 9/065; C02F 1/441; C02F 2103/023; B01D 61/025; B29C 45/72; B29C 45/7337
See application file for complete search history.

(56) References Cited

U.S. PATENT DOCUMENTS

| | | | | |
|---|---|---|---|---|
| 4,779,400 A * | 10/1988 | Hoskinson | .............. | B65B 9/087 53/451 |
| 5,285,841 A * | 2/1994 | Yamauchi | .......... | B22D 17/2218 164/157 |
| 6,412,288 B1 * | 7/2002 | Orsen | .................... | B29C 35/16 62/50.2 |

(Continued)

FOREIGN PATENT DOCUMENTS

JP 10109092 A * 4/1998

OTHER PUBLICATIONS

Machine translation of JP 10109092 A, Jul. 18, 2017.*

*Primary Examiner* — Benjamin L Lebron
(74) *Attorney, Agent, or Firm* — Mark M. Friedman

(57) ABSTRACT

A cooling system (10) for molding fixtures, and particularly for foundry molds, comprising: —water treatment means (11)—compressed air generation means (12)—means (13) for pressurizing the treated water—a device (14) for mixing air with the treated water, and for the controlled ejection of atomized water under pressure toward a cooling circuit (16) of a molding fixture.

7 Claims, 3 Drawing Sheets

(56) References Cited

U.S. PATENT DOCUMENTS

| | | | |
|---|---|---|---|
| 2008/0185311 A1* | 8/2008 | Maggio | B29C 41/06 206/524.2 |
| 2008/0257431 A1* | 10/2008 | Gruber | B29C 35/007 137/597 |
| 2009/0315231 A1* | 12/2009 | Furukawa | B22C 9/065 266/46 |

* cited by examiner

COOLING SYSTEM FOR MOLDING FIXTURES, PARTICULARLY FOR FOUNDRY MOLDS The present invention relates to a cooling system for molding fixtures, and particularly for foundry molds.

The invention also relates to a device for mixing air and treated water, and for the controlled ejection of atomized water under pressure.

In particular, such a system is applied on molds for the production of castings of light alloys, permanent-mold castings, low-pressure or high-pressure die castings, but it should be understood that it can be applied to molding fixtures in general.

Nowadays devices for molding castings for metallic alloys are provided with cooling circuits which comprise coils that are provided in the areas of the fixture where an effective and rapid reduction of the temperature is required during the solidification of the casting.

In the majority of cases, the fluid circulating in such cooling circuits is compressed air, which is blown into the coils and is adapted to remove a preset quantity of heat, and is then dispersed in the environment.

The coils are normally incorporated into the molding fixture.

Also known and widespread are cooling systems in which the circulating fluid is water, conveniently treated in order to prevent limescale from compromising its correct operation.

Using water as the heat removal fluid is far more effective than using air, but using water cooling systems entails some drawbacks.

A first drawback is the thermal shock generated by the passage of the fluid inside the adapted channels and the adapted slots which are often provided in the body of the mold.

In the event of an excessive thermal head between the water and the internal temperature of the mold, there is the risk that cracks will form in the mold, which can damage it irreparably.

In water systems made from components that are separate from the mold, problems may arise with the seals in the areas joining such components, with the risk of water leaking both outside and inside the mold, an event that can compromise the correct operation of the latter.

Furthermore, the heated water that exits from the mold or from the system associated with it must be suitably treated for its disposal or reuse.

The aim of the present invention is to provide a cooling system for molding fixtures in foundries, which is capable of overcoming the above-mentioned drawbacks of conventional cooling circuits and cooling systems.

Within this aim, an object of the invention is to provide a cooling system that is capable of combining the advantages of air systems with the effectiveness of water circuits.

Another object of the invention is to provide a cooling system that can also be fitted on existing molding fixtures.

Another object of the invention is to provide a cooling system that does not produce thermal shocks in the mold with which it is associated, and which is immune to leaks owing to problems of excess pressure.

Another object of the invention is to provide a cooling system for molding fixtures, and particularly for foundry molds, which can be provided with conventional technologies.

This aim and these and other objects which will become more evident hereinafter are achieved by a cooling system for molding fixtures, and particularly for foundry molds, characterized in that it comprises:
- water treatment means
- compressed air generation means
- means for pressurizing the treated water
- a device for mixing air with said treated water and for the controlled ejection of atomized water under pressure toward a cooling circuit of a molding fixture.

Further characteristics and advantages of the invention will become more apparent from the description of two preferred, but not exclusive, embodiments of the cooling system according to the invention, which are illustrated for the purposes of non-limiting example in the accompanying drawings wherein:

FIG. 1 schematically illustrates a cooling system according to the invention;

Figure 1:
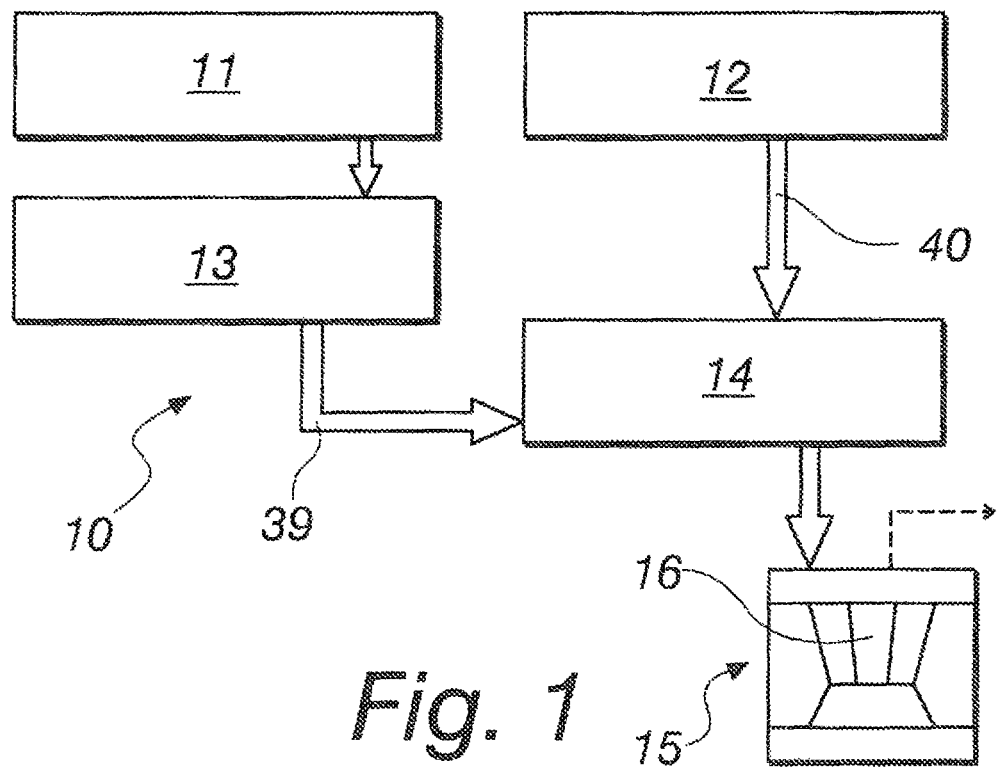

With reference to the figures, a cooling system for molding fixtures, and particularly for foundry molds, according to the invention, is generally designated with the reference numeral 10.

Such cooling system 10 comprises:
- water treatment means 11, which are arranged on a water supply line,
- compressed air generation means 12, which are associated with an air supply line,
- means for pressurizing the treated water 13,
- a device 14 for mixing air with the treated water, and for the controlled ejection of atomized water under pressure toward a cooling circuit 16 of a molding fixture 15.

Figure 2:
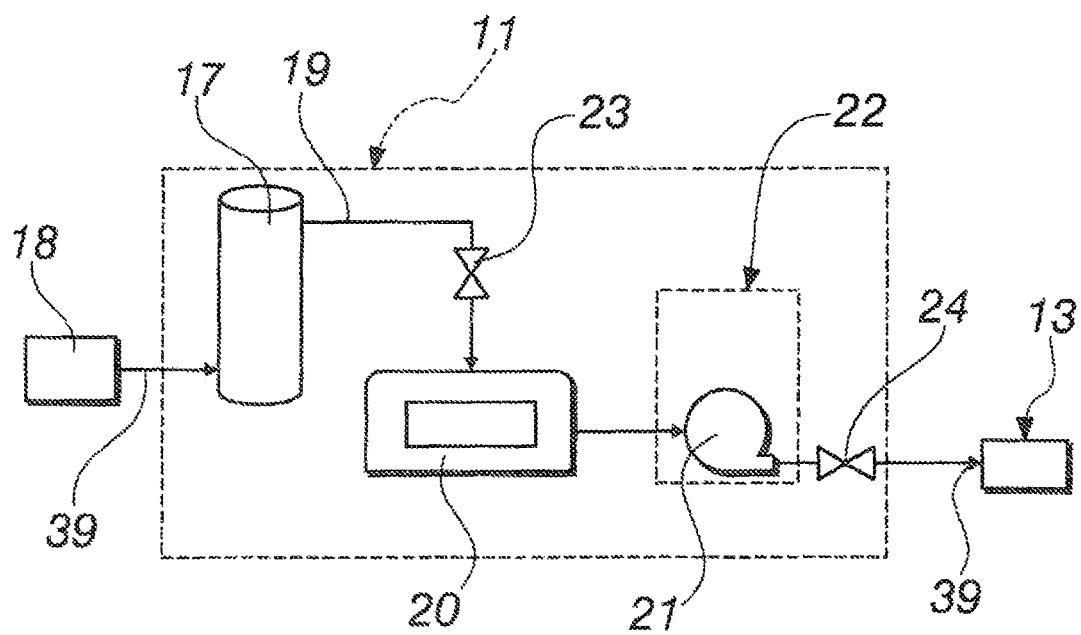
FIG. 2 is a diagram of the water treatment means of a system according to the invention.
Figure 3:
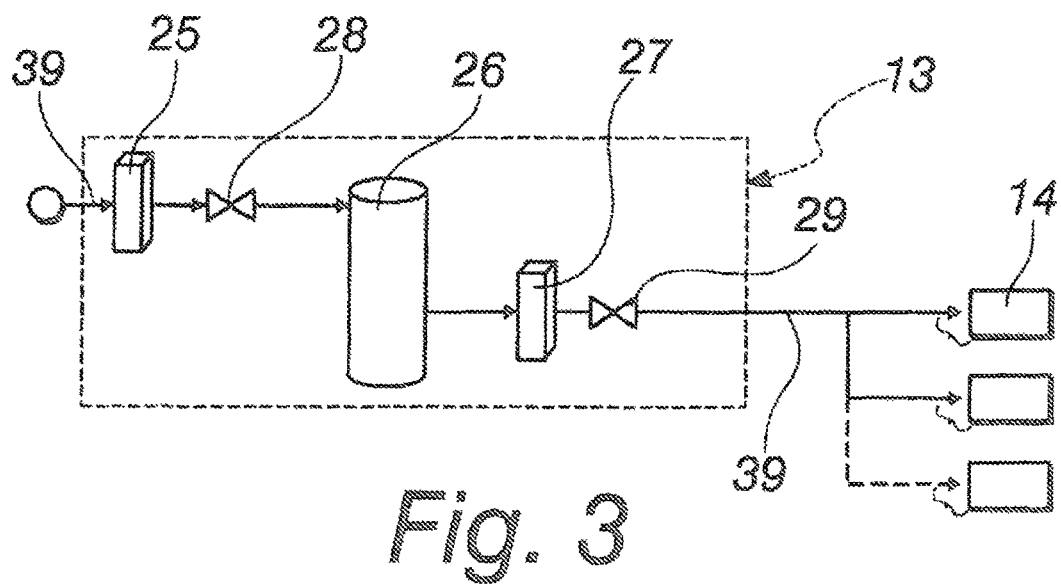
FIG. 3 is a diagram of the pressurization means of a system according to the invention.
Figure 4:
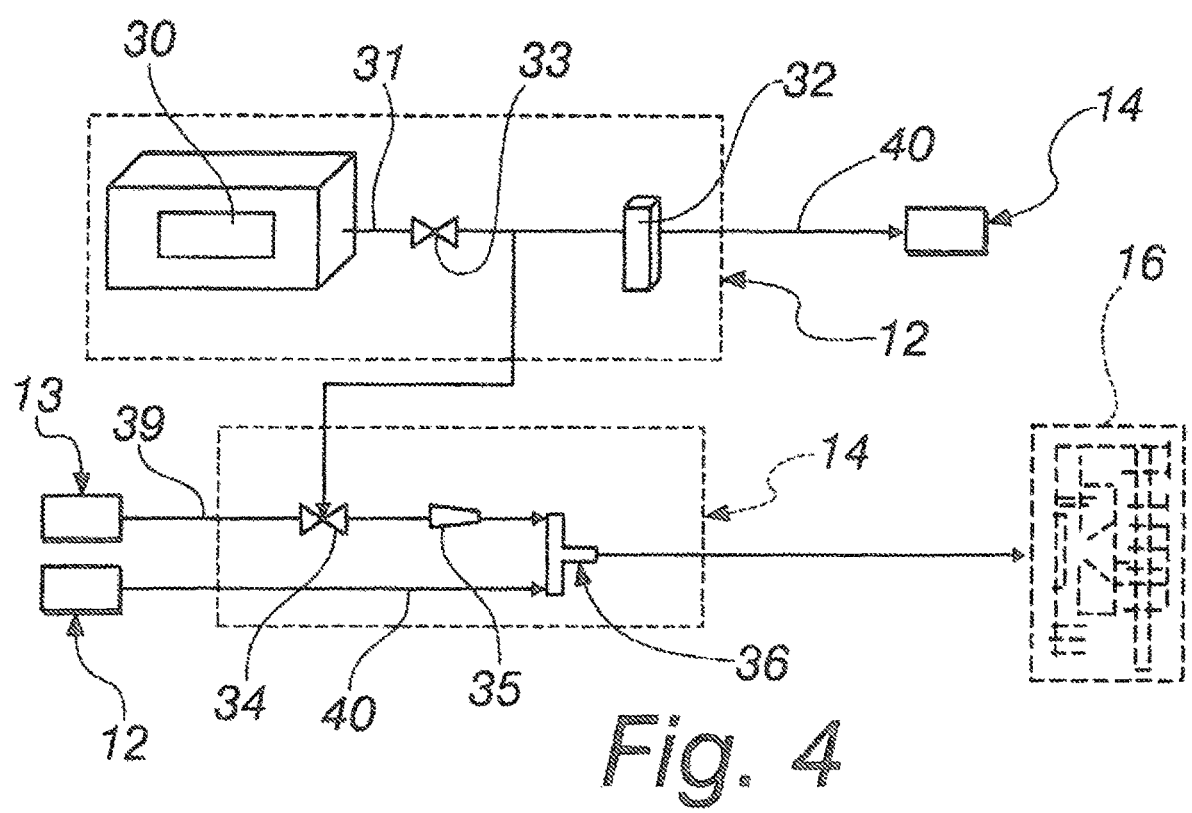
FIG. 4 is a diagram of the compressed air generation means and of the associated mixing and ejection means of a system according to the invention.

The water treatment means 11, as shown in schematic form in FIG. 2, comprise a water treatment unit 17, of the reverse osmosis or demineralization type, to which the water is supplied by a water mains 18.

The demineralized water that exits from the water treatment unit 17 passes through a duct 19 into a tank 20, which is kept at a constant level as subsequent means 22 of supplying the treated water draw the treated water from the tank 20 and transfer it to the means for pressurizing the treated water 13.

In such first embodiment of the invention, the supply means 22 for the treated water are constituted by a supply pump 21, which is adapted to provide pressurized treated water to the water pressurization means 13.

Such water treatment means 11 comprise a first stopcock 23 between the treatment unit 17 and the tank 20, and a second stopcock 24 at the exit from the supply pump 21.

The means 13 of pressurizing the treated water comprise, in sequence on the same line, a pressure reduction device 25, a tank 26, and a filtering device 27, after which the water reaches the mixing and ejection device 14.

There are two stopcocks, a first stopcock 28 between the pressure reduction device 25 and the tank 26, and a second stopcock 29 at the exit from the pressure reduction device 25.

Exiting from such pressurization means 13 there is thus treated water, demineralized, and at a preset pressure, for example 5 bar.

The compressed air generation means 12 comprise a compressed air system 30, which is usually already fitted for molding fixtures with which the cooling system 10 is associated, for example a press, and thus of a conventional type, one branch 31 of which has a pressure reduction device 32, with a solenoid control valve 33 upstream.

Exiting from the compressed air generation means 12 there is compressed air at a preset pressure value, for example 4 bar.

Conveniently, the value of the pressure of the treated water that exits from the water pressurization means 13 is one bar higher than the pressure of the air that exits from the compressed air generation means 12.

In conventional cooling systems, the mixing of air and water is done while keeping both the air and the water at the same operating pressure.

Normally, however, the air and water lines are very different from each other, and each of them has a different length, with curves and areas at different temperatures, and these differences determine different drops in pressure in the two circuits, with the consequence that if the same operating pressure is used both for the water and for the air, the mixing is neither constant nor repeatable, since sometimes the water flow predominates, and sometimes the air flow predominates, and thus the cooling obtained in the circuit of the molding fixture is inconsistent and thus is not satisfactory.

In numerous laboratory tests and equally numerous field tests, it has been found that in practice if the pressure in the water line 39 is always at least one bar higher than the pressure in the air line 40, the water always arrives in the cooling circuit 16 of the molding fixture 15.

The mixing and ejection device 14 comprises a pneumatic valve 34 that actuates the opening of the water circuit, i.e., the line connected to the water pressurization means 13, the pneumatic valve 34 being actuated by the passage of the air between the solenoid control valve 33 of the compressed air generation means 12 and the air pressure reduction device 32.

The treated water under pressure is caused to pass, downstream of the pneumatic valve 34, through a calibrated nozzle 35.

Figure 6:
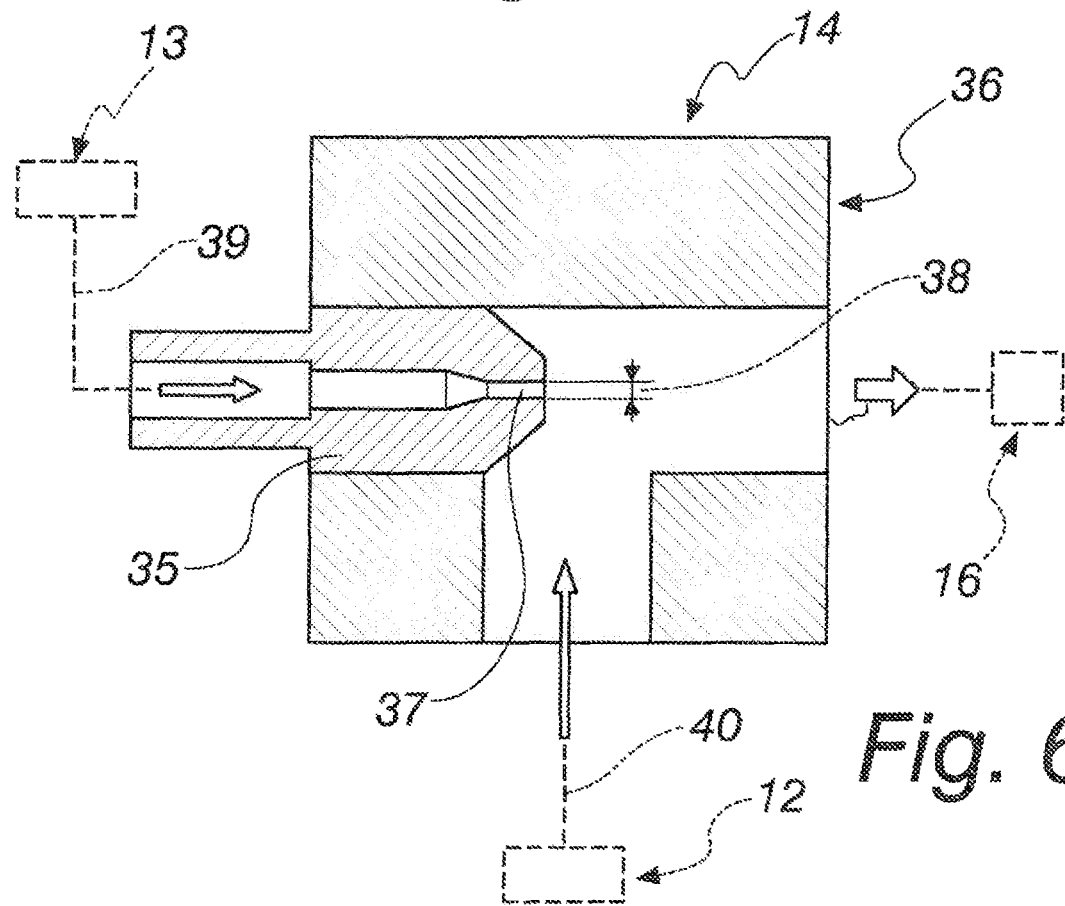
FIG. 6 is a cross-sectional view of the mixing and ejection device of a system according to the invention.

Such calibrated nozzle 35, clearly visible in FIG. 6, has a calibrated water exit hole 37 with a diameter 38 of for example 0.3 millimeters, which is calculated to have approximately 110 milliliters per minute of water under a pressure of 5 bar, in contrast to the 4 bar on the air line, a preset flow-rate that is calculated to be optimal for most cooling circuits already fitted to foundry molding fixtures known today.

By playing with the values of the operating pressure on the water line and with the size of the diameter 38 of the calibrated nozzle 35, it is possible to modify the water flow-rate in order to obtain its optimal value depending on the molding fixture 15 to be served.

The treated water under pressure originating from the water pressurization means 13 and the air under pressure exiting from the compressed air generation means 12 both pass through a three-way connector 36, and are mixed inside it.

What remains constant is the pressure difference of one bar higher of the operating pressure on the water line than on the air line.

When the system according to the invention is applied on a molding fixture 15 the cooling circuit 16 of which, already integrated, is of the type that works with air, the diameter 38 of the hole 37 of the nozzle 35 must not be larger than 0.3 millimeters.

Such three-way connector 36 is of a conventional type and available on the market.

In such a three-way connector 36, air under pressure and water under pressure are mixed and ejected in the form of atomized water, or humidified air, under pressure, which is directed into the cooling circuit 16 of the molding fixture 15 on which the cooling system 10 according to the invention is applied.

Figure 5:
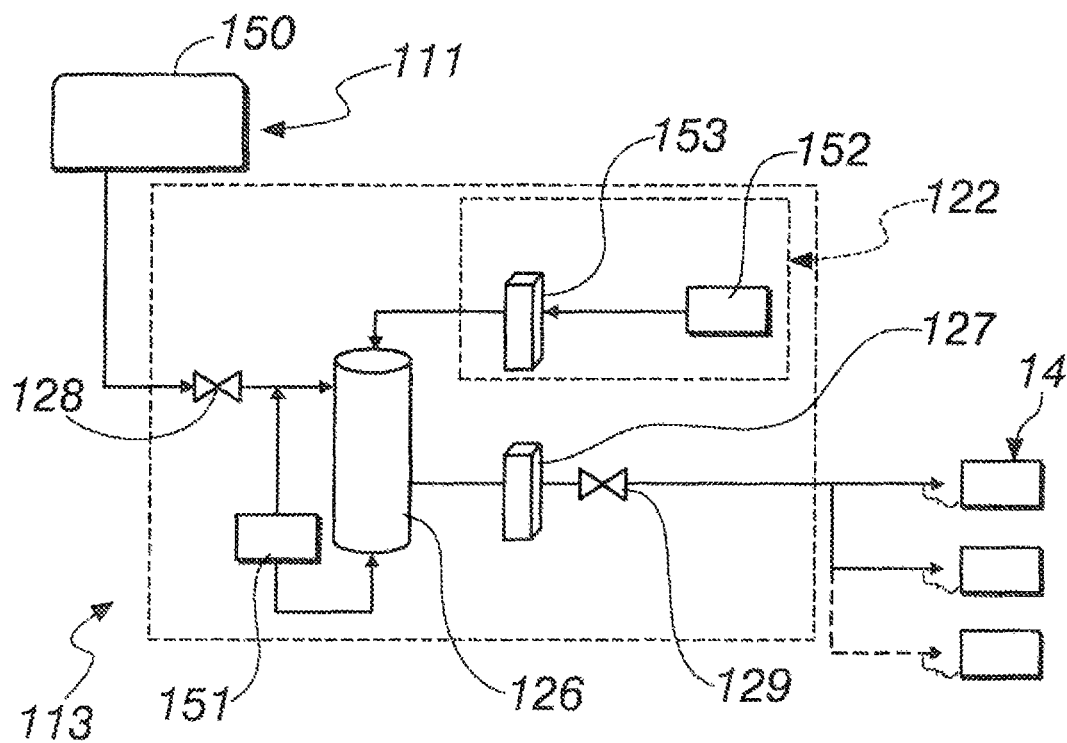
FIG. 5 shows a second embodiment of the water treatment means and treated water pressurization means of a system according to the invention.

FIG. 5 shows a second embodiment of the water treatment means, designated with the reference numeral 111, and of the water pressurization means 113 which are connected to them.

In such second embodiment, the water treatment means 111 simply comprise a container of demineralized water 150, and thus is used if the molding fixture on which the system according to the invention is applied is not equipped with the water treatment means 11 described above for the first embodiment of the cooling system according to the invention 10 described above, and normally already provided on the molding fixture.

The water pressurization means 113 comprise a pressurization tank 126, which is provided with a level indicator 151, and a filtering device 127 at the exit point from the pressurization tank 126.

A first stopcock 128 is arranged upstream of the pressurization tank 126, and a second stopcock is arranged downstream of the filtering device 127.

In such second embodiment of the invention, the supply means 122 for the treated water are constituted by an air pumping device 152, for example a compressed air line that is already operational and used for the molding fixture 15, followed by an air pressure reduction device 153, which is adapted to propel air into the pressurization tank 126, so that the demineralized water that exits from it is available to the mixing and ejection device 14 at the optimal preset pressure.

The invention also relates to a device 14 for mixing air and treated water, and for the controlled ejection of atomized water under pressure toward a cooling circuit 16 of a molding fixture 15, as described above.

Such device 14 is characterized in that it comprises
  a calibrated nozzle 35, which has a calibrated water exit hole 37 the diameter 38 of which is such as to yield a predefined flow-rate of water under pressure at a preset operating pressure,
  a three-way connector 36, in which water under pressure from the calibrated nozzle 35 and compressed air from the compressed air generation means 12 enter.

The device 14 comprises a pneumatic valve 34 that actuates the opening of a water line that is connected to water pressurization means 13, the pneumatic valve 34 being actuated by the passage of air between a solenoid control valve 33 of compressed air generation means 12 and an air pressure reduction device 32.

In practice it has been found that the invention fully achieves the intended aim and objects.

In particular, with the invention a cooling system is provided that combines the advantages of air systems with the effectiveness of water circuits.

In fact, such cooling system according to the invention, thanks to the water pressurization means and to the compressed air generation means, which are conveniently mixed as described above, makes it possible to achieve the ejection of humidified air containing a low percentage of water, approximately 110 milliliters per minute, which is sufficient to constantly achieve the precise and repeatable cooling of the molding fixture on which it is applied.

In this manner the constant and precise percentage of water used determines a precise and constant control of the cooling temperature of the mold, with a consequent decrease in the number of production discards.

Another important object of the invention is to provide a cooling system that can also be fitted on existing molding fixtures, thanks to the ability to be connected to the compressed air system of the molding fixture on which it is applied for the supply of compressed air, and thanks to the ability to inject the humidified air produced into the cooling circuits that are already defined in the molding fixture.

In particular, with the invention a cooling system is provided that makes it possible to use a pressure on the air line, 4 bar, which is lower than the pressure used in the standard compressed air circuit, 7-9 bar, that is already provided on molding fixtures with compressed air cooling circuits; in fact compressed air alone removes much less heat than humidified air, and as a consequence the use of humidified air, or atomized water, makes it possible to adopt a much lower operating pressure, with consequent energy saving for the compressor.

What is more, with the invention a cooling system is provided that, thanks to the humidified air, makes it possible to shorten cooling times, with consequent reduction of molding cycle times and better yield in terms of productivity of the molding fixture.

Furthermore, the cooling system according to the invention is capable of serving a plurality of cooling circuits in parallel.

Furthermore, with the invention a cooling system is provided which does not produce thermal shocks in the mold with which it is associated, since the passage of humidified air in the cooling circuit causes less sudden thermal rushes, and which is immune against leaks owing to problems of excess pressure.

Furthermore, with the invention a cooling system is provided which is quieter than conventional system, thanks to the lower air pressure used.

With the invention a device is also provided for mixing air and treated water and for ejection, which optimizes the operation of the system according to the invention.

In addition, with the invention a cooling system is provided for molding fixtures, and particularly for foundry molds, and a device is provided for mixing air and treated water, and for the controlled ejection of atomized water under pressure toward a cooling circuit of a molding fixture, which can both be provided with conventional technologies.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The content of Italian patent application no. PD2012A000402, the priority of which is claimed in the present application, is incorporated as a reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. An operating method of a cooling system for molding fixtures, wherein the cooling system comprises:
   water treatment means,
   compressed air generation means connected to an air line,
   water pressurization means, which are connected to the water treatment means and are connected to a water line, and
   a mixing and ejection device, which is connected to the compressed air generation means and to the water pressurization means, and comprises:
      a nozzle, which is connected to the water line and has a water exit hole, and
      a three-way connector connected to the nozzle and to the air line;
   wherein the operating method comprises that:
   the water pressurization means pressurize treated water into the water line, so that treated water under pressure is caused to pass through the nozzle that yields, through the water exit hole, a predefined flow-rate of water under pressure,
   the compressed air generation means pressurize air into the air line,
   treated water under pressure from the nozzle and compressed air from the compressed air generation means enter in the three-way connector and are mixed inside the three-way connector, so that the mixing and ejection device ejects a controlled ejection of atomized water under pressure toward a cooling circuit of a molding fixture;
   wherein compressed air exiting from the compressed air generation means is at a first preset pressure value;
   wherein treated water under pressure exiting from the water pressurization means is at a second preset pressure value;
   wherein the second preset pressure value of the treated water under pressure that exits from the water pressurization means is at least one bar higher than the first preset pressure value of the compressed air that exits from the compressed air generation means.

2. The operating method of claim 1, wherein the pressure of the treated water under pressure in the water line is always at least one bar higher than the pressure of the compressed air in the air line.

3. The operating method of claim 1, wherein the first preset pressure value of the compressed air is 4 bar, and the second preset pressure value of the treated water under pressure is 5 bar.

4. The operating method of claim 1, wherein the controlled ejection of atomized water has a percentage of water approximately of 110 milliliters per minute.

5. The operating method of claim 1, wherein the water treatment means comprise:
   a water treatment unit using reverse osmosis or demineralization,
   a tank connected to the water treatment unit through a duct, and
   treated water supplying means connected to the tank;
   wherein the operating method comprises that water is supplied, by a water mains, to the water treatment unit, and demineralized water exits from the water treatment unit and passes, through the duct, to the tank, in which the demineralized water is kept at a constant level while the treated water supplying means draw the treated water from the tank and transfer the treated water to the water pressurization means.

6. The operating method of claim 1, wherein the water pressurization means comprise: a pressurization tank provided with a level indicator, a filtering device at an exit point from the pressurization tank, and an air pumping device, which is followed by an air pressure reduction device and is connected to the pressurization tank;

wherein the operating method comprises that the air pumping device propels air into the pressurization tank, so that treated water exits from the pressurization tank and is sent to the mixing and ejection device at the second preset pressure value.

7. The operating method of claim 1, wherein the compressed air generation means comprise a compressed air system directly connected to a branch, the branch further connected to the air line downstream from the compressed air system, wherein the branch is provided with a solenoid control valve and the air line is provided with a pressure reduction device, wherein the mixing and ejection device comprises a pneumatic valve, which is connected to the branch downstream of the solenoid control valve and upstream of the air line, and is arranged on the water line upstream of the nozzle;

wherein the operating method comprises that the pneumatic valve is actuated by the passage of the air between the solenoid control valve and the air pressure reduction device, for actuating the opening of the water line.

\* \* \* \* \*